(12) United States Patent
Thiesson et al.

(10) Patent No.: US 7,548,856 B2
(45) Date of Patent: Jun. 16, 2009

(54) SYSTEMS AND METHODS FOR DISCRIMINATIVE DENSITY MODEL SELECTION

(75) Inventors: Bo Thiesson, Woodinville, WA (US); Christopher A. Meek, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1079 days.

(21) Appl. No.: 10/441,470

(22) Filed: May 20, 2003

(65) Prior Publication Data

US 2004/0236576 A1    Nov. 25, 2004

(51) Int. Cl.
G10L 15/06    (2006.01)
(52) U.S. Cl. ...................................... 704/245
(58) Field of Classification Search .................. 704/245
See application file for complete search history.

(56) References Cited

FOREIGN PATENT DOCUMENTS

EP    0903730 A2 *  3/1999

OTHER PUBLICATIONS

Danfeng Li, Alain Biem, Jayashree Subrahmonia, "HMM Topology Optimization for Handwriting Recognition", IEEE 2001.*
Alain Biem, Jin-Young Ha, Jayashree Subrahmonia, "A Bayesian Model Selection Criterion for HMM Topology Optimization", IEEE 2002.*

S. Agi and R. Mceliece, The Generalization Distributive Law, IEEE Transactions on Information Theory, vol. 46, No. 2, Mar. 2000, pp. 325-343.
S. Arnborg, D. G. Corneil and A. Proskurowski, Complexity of Finding Embeddings in a k-tree, SIAM Journal of Algebraic Discrete Methods, vol. 8, No. 2, pp. 277-284.
P. Cheeseman and J. Stutz, Bayesian Classification (Auto Class): Theory and Results, Advances in Knowledge Discovery and Data Mining, AAAI Press, Menlo Park, CA., pp. 153-180.
X. Huang, A. Acero, F. Alleva, M.-Y Hwang, L. Jiang, and M. Mahajan, Microsoft Windows Highly Intelligent Speech Recognizer: Whisper, IEEE International Conference on Acoustics, Speech and Signal Processing, 1995, ICASSP-95, vol. 1, pp. 93-96.
B. Thiesson, C. Meek, D. Chickering and D. Heckerman, Computationally Efficient Methods for Selecting Amongst Mixtures of Graphical Models, Bayesian Statistics 6: Proceedings of the Sixth Valencia International Meeting, Clarendon Press, Oxford, pp. 631-656.
Bo Thiesson and Christopher Meek, "Discriminative Model Selection for Density Models", Jan. 3, 2003, 6 pages.

* cited by examiner

*Primary Examiner*—Talivaldis I Smits
*Assistant Examiner*—Eric Yen
(74) *Attorney, Agent, or Firm*—Lee & Hayes, PLLC

(57) ABSTRACT

The present invention utilizes a discriminative density model selection method to provide an optimized density model subset employable in constructing a classifier. By allowing multiple alternative density models to be considered for each class in a multi-class classification system and then developing an optimal configuration comprised of a single density model for each class, the classifier can be tuned to exhibit a desired characteristic such as, for example, high classification accuracy, low cost, and/or a balance of both. In one instance of the present invention, error graph, junction tree, and min-sum propagation algorithms are utilized to obtain an optimization from discriminatively selected density models.

37 Claims, 11 Drawing Sheets

| CASE | $x_1^1$ | $x_1^2$ | $x_2^1$ | $x_2^2$ | $x_3^1$ | $x_3^2$ | $x_4^1$ | $x_4^2$ |
|---|---|---|---|---|---|---|---|---|
| MODEL RANKING | $M_1^2$ $M_3^1$ $M_1^1$ | $M_1^1$ $M_3^2$ $M_1^2$ | $M_2^2$ $M_3^1$ $M_3^2$ $M_1^1$ $M_2^1$ | $M_2^2$ $M_2^1$ | $M_3^1$ $M_4^2$ $M_3^2$ | $M_1^2$ $M_3^2$ $M_3^1$ | $M_3^1$ $M_4^2$ $M_4^1$ | $M_4^2$ $M_3^1$ $M_4^1$ |

MODEL RANKING

POTENTIAL TABLES

| $M_1^1$ | $M_2^1$ | $M_3^1$ | $M_3^2$ |
|---|---|---|---|
| | $M_2^2$ | 2 | 1 |
| | $M_2^1$ | 1 | 0 |
| $M_1^2$ | $M_2^2$ | 2 | 3 |
| | | 1 | 2 |

| | $M_4^1$ | $M_4^2$ |
|---|---|---|
| $M_3^1$ | 2 | 1 |
| $M_3^2$ | 0 | 1 |

FIG. 6

POTENTIAL TABLES (AFTER MIN-SUM)

| | $M_3^1$ | $M_3^2$ |
|---|---|---|
| $M_2^1$ | 3 | 1 |
| $M_2^2$ | 2 | 0 |
| $M_2^1$ | 3 | 3 |
| $M_2^2$ | 2 | 2 |

Row labels (left column): $M_1^1$, $M_1^1$, $M_1^2$, $M_1^2$

| | $M_4^1$ | $M_4^2$ |
|---|---|---|
| $M_3^1$ | 3 | 2 |
| $M_3^2$ | 0 | 1 |

SYSTEMS AND METHODS FOR DISCRIMINATIVE DENSITY MODEL SELECTION

TECHNICAL FIELD

The present invention relates generally to density models utilized in classifiers and more particularly to systems and methods for discriminatively selecting density models to optimize a classifier.

BACKGROUND OF THE INVENTION

Computers have become an integral part of society. Every day people become more dependent on this technology to facilitate both work and also leisure activities. A significant drawback to such technology is its "digital" nature as compared to the "analog" world in which it functions. Computing technology operates in a digital domain that requires discrete states to be identified in order for information to be processed. In simple terms, information must be input into a computing system with a series of "on" and "off" states. However, humans live in a distinctly analog world where occurrences are never completely black or white, but always seem to be in between shades of gray. Thus, a main difference between digital and analog is that digital requires discrete states that are disjunct over time (e.g., distinct levels) while analog is continuous over time. Since humans naturally operate in an analog fashion, computing technology has evolved to reduce the impact it has when interfacing with "nondigital entities" or humans.

Handwriting and speech recognition technologies have progressed dramatically in recent times to facilitate with these digital computing interfaces. This enables a computer user to easily express themselves and/or input information into a system. Since handwriting and speech are the basics of a civilized society, these skills are generally learned by a majority of people as a societal communication requirement, established long before the advent of computers. Thus, no additional learning curve for a user is required to implement these methods for computing system interaction. However, a much greater burden is required of the computing system itself to process these types of interfaces. So, typically, as it becomes easier for a human to interface with a machine, the burden on the machine increases dramatically when it is required to learn from a human. In computing terms, this burden equates to a requirement for a very fast "processor" which can compute extreme amounts of information in a very short amount of time. Because processing power varies, a distinction is normally made between "real-time" processing and general processing. When human interaction is involved, humans typically need "feedback" within a short period of time or they will lose interest and/or assume something has gone wrong. Thus, for "ergonomic" reasons, an even greater emphasis is placed on the computing system to respond within a "human-factored" time frame or, in other words, as close to real-time as possible.

Extreme processor workloads can readily be seen especially when computing systems are employed to interpret either handwriting or speech recognition data. This is based upon the fact that, for a given letter or sound, there is a multitude of variations that must be accounted for by the system. In earlier forms of technology, a computing system would attempt to process every conceivable variation from a database of possibilities. This required extensive computations and generally did not produce very accurate results nor "real-time" interaction with the user. Typically, users would have to speak slowly and pause for speech recognition systems or would have to submit handwriting samples and wait for analysis from handwriting recognition systems. Obviously, any equation with an infinite number of possibilities that must be solved in a computing system can, theoretically, take an infinite amount of time. This, however, is unacceptable by a typical user. Thus, technology has evolved to speed up the process and create a much more efficient means of assessing these types of user inputs.

Initial attempts at achieving gains in this area included speeding up the processor and training the user to adapt themselves to a given set of inputs. Handwriting systems required a user to learn stroke patterns or submit many writing samples to facilitate in recognizing the data. Likewise, speech recognition systems limited the number of "commands" or spoken words allowed for processing or required a user to recite long sessions of predetermined prose to aid in quickly ascertaining that user's spoken word. Technology has continued to develop to reach a point where a system can accurately and quickly interact with a user. This has led to an increased focus on systems that can adapt readily to a multitude of users. One way of achieving this type of system is to utilize a "classification" system. That is, instead of attempting to confine data to "right" or "wrong," allow it to fall within a particular "class" of a classification. An example of this would be a user whose handwriting varies slightly from day-to-day or has a cold while trying to "talk" to a computer. Thus, with either example, a traditional system might not understand what was written or spoken. This is because the system is attempting to make a black and white assessment of the input data. However, with a classification based system, a negative response might only be given if the handwriting was so varied as to be illegible or the spoken word was so varied as to be indistinguishable from noise.

Thus, classification systems give new life to human-machine interfaces employed by computing systems. They allow for much greater flexibility and require less learning by the user in order to utilize the system. The main drawback to these types of solutions is that they remain computationally intensive. In other words, they have greater flexibility but at the expense of requiring very fast computers or have sluggish response times in a typical processor situation. A general rule for these types of systems is that greater accuracy requires longer processing times. This penalty typically falls on the user to either accept lower recognition accuracy or wait longer for the recognition to occur.

To operate, these systems employ a "classifier" which interprets data and decides which class the data belongs to. Classifiers facilitate computing systems to recognize the data input by a user. They are developed in many different ways and employ any number of methods to build. However, with current technology, classifiers are still very complex and require extensive processing power, slowing the analysis of recognition samples. Although mainframe, super computers, and even extravagant desktop computing systems may be able to adequately handle this type of interface, it is typically precluded from the mobile computing systems due to the amount of processing required. This factor becomes increasingly evident as the computing market evolves towards a mobile one, requiring small, easily portable, user-friendly devices.

SUMMARY OF THE INVENTION

The following presents a simplified summary of the invention in order to provide a basic understanding of some aspects of the invention. This summary is not an extensive overview of the invention. It is not intended to identify key/critical elements of the invention nor to delineate the scope of the invention. Its sole purpose is to present some concepts of the invention in a simplified form as a prelude to the more detailed description that is presented later.

The present invention relates generally to density models utilized in classifiers and more particularly to systems and methods for discriminatively selecting density models to optimize a classifier. Density models are leveraged via a discriminative model selection scheme to provide an optimized density model subset employable in constructing a classifier. By allowing multiple alternative density models to be considered for each class in a multi-class classification system and then developing an optimal configuration comprised of a single density model for each class, the classifier can be tuned to optimally exhibit a desired characteristic such as, for example, high accuracy. The present invention accomplishes this by first permitting multiple alternative density models to be considered for each class instead of only one. Techniques are then employed to evaluate possible combinations (or configurations) of single density models selected from each class that yield the best solution to a desired characteristic. One of the techniques employed in one instance of the present invention includes, but is not limited to, utilizing error graph, junction tree, and min-sum propagation algorithms to ascertain an optimized configuration of the density models. Thus, a large number of configurations can be evaluated and the best candidate density model can be found for each class for the purpose of optimizing a classifier for a desired characteristic.

The present invention also facilitates improving classifiers by reducing the size of density models utilized to represent recognition classes, and thus, the size of the classifier itself, producing a size-adjustable classifier with accuracy applicable to a given situation. In one instance of the present invention, this is accomplished by obtaining a set of alternative density models for each class, a data set for testing the density models, and a cost function for evaluating the size of each density model. A representative density model for each class is then selected based upon a balancing of the classification accuracy of the density models with the test data and an evaluation of the cost function on the density models. This permits a comparison of multiple density models of different classes to find the optimal model for a class in a particular situation. This allows computing systems with low processing capabilities such as handhelds, tablets, and miniaturized laptops, to employ recognition systems that would otherwise prove too computationally intensive to run on these devices. Thus, the adjustability of the density model subset in the optimized configuration permits classifiers to be modified to suit the needs of a device whether for accuracy, size, a balance of size and accuracy, and/or another characteristic.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 4 is a table illustrating a method of discriminative density model selection in accordance with an aspect of the present invention.

FIG. 6 is another table illustrating a method of discriminative density model selection in accordance with an aspect of the present invention.

FIG. 7 is yet another table illustrating a method of discriminative density model selection in accordance with an aspect of the present invention.

DETAILED DESCRIPTION OF THE INVENTION

Figure 1:
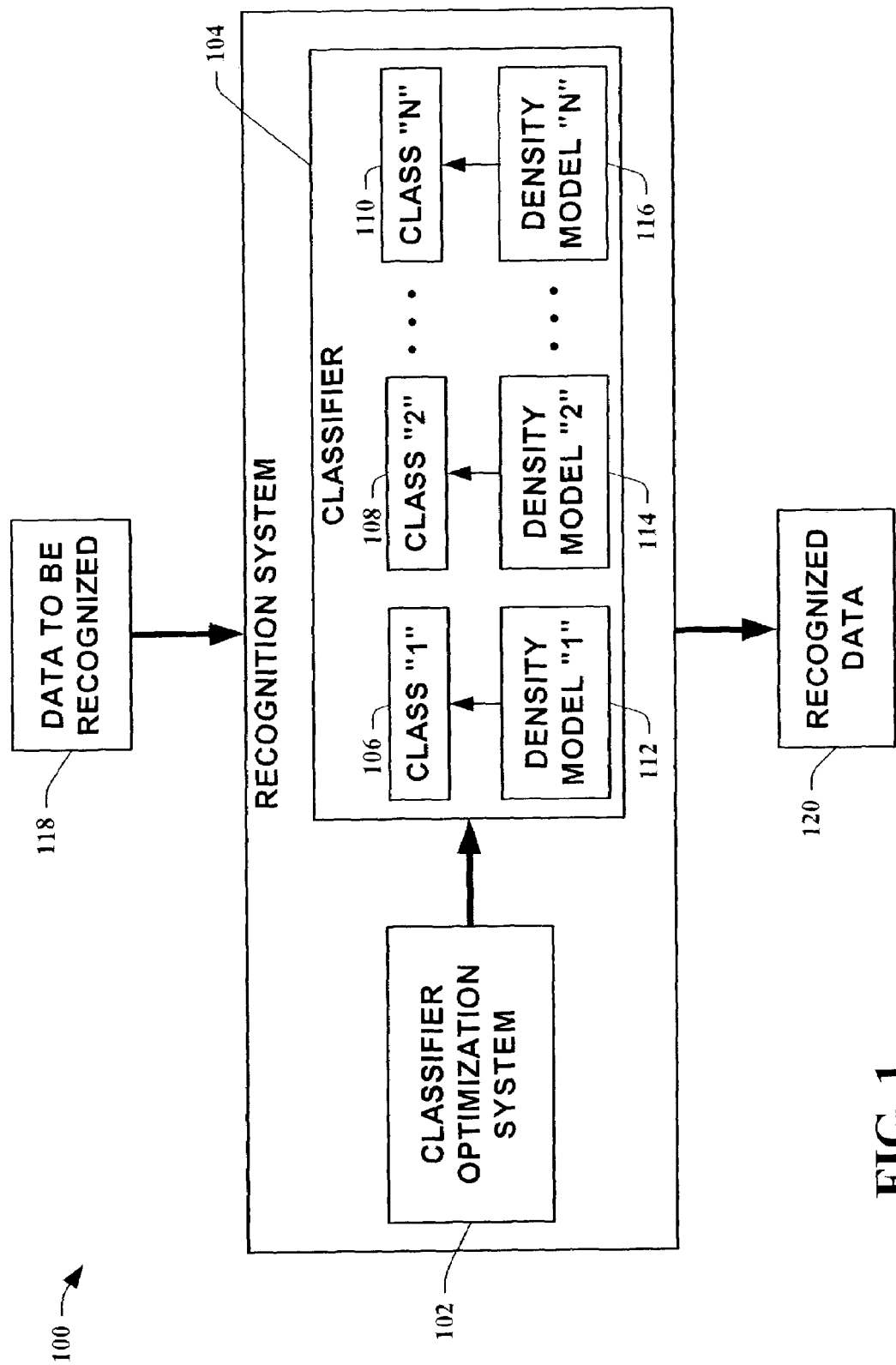
FIG. 1 is a block diagram of a recognition system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

Some traditional recognition modeling techniques utilize density model representations of recognition classes. However, the traditional modeling techniques typically select a density model on a per-class basis and do not consider density model selections made for other classes. The present invention provides a discriminative technique for improving the classification accuracy of density models and/or reducing the size of density models utilized to represent recognition classes. In one aspect of the present invention, a set of alternative density models is obtained for each recognition class along with a data set for testing the data models and a cost function for evaluating each density model. A single representative density model for each class is then selected based upon a balancing of the classification accuracy of the density models with the test data and an evaluation of the cost function on the density models. This permits a classifier to be built even when there are size restrictions on a classification model as is typical with smaller handheld computing systems. In another instance of the present invention, the technique can be employed in a situation where cost is not a factor to construct an optimal classifier from a multitude of possible configurations of density models in a computationally efficient manner. In another instance of the present invention, an error graph, a junction tree and min-sum propagation algorithms are implemented to select an appropriate density model for each recognition class.

In FIG. 1, a block diagram of a recognition system 100 in accordance with an aspect of the present invention is shown. In this instance of the present invention, the recognition system 100 is comprised of a classifier optimization system 102 and a classifier 104 having classes 1 to N 106-110, where N represents any integer from one to infinity. The classifier 104 is based upon density models 1 to N 112-116, where N once again represents any integer from one to infinity. Only one density model per class is utilized to construct the classifier 104. The density models 112-116 are discriminatively selected by the classifier optimization system 102. In other instances of the present invention, the system 102 can be a stand alone entity that provides information to construct a classifier and/or even provides a classifier to a recognition system. In other words, the classifier optimization system 102 is not required to be part of a recognition system to function.

In typical recognition systems, such as handwriting and/or speech recognition systems, data 118 is input into the recognition system 100 to be processed. The classifier 104 operates on the data 118 to determine how to classify it. The recognition system 100 then processes the classified data and makes recognized data 120 available to a system and/or user. Classifiers often tend to be complex and require large amounts of processing time. By using a classifier optimization system 102 that utilizes discriminatively selected density models, substantial accuracy is maintained while substantially reducing the size (i.e., "cost") of the classifier 104, and thus, requiring substantially less processing power to recognize data.

Figure 2:
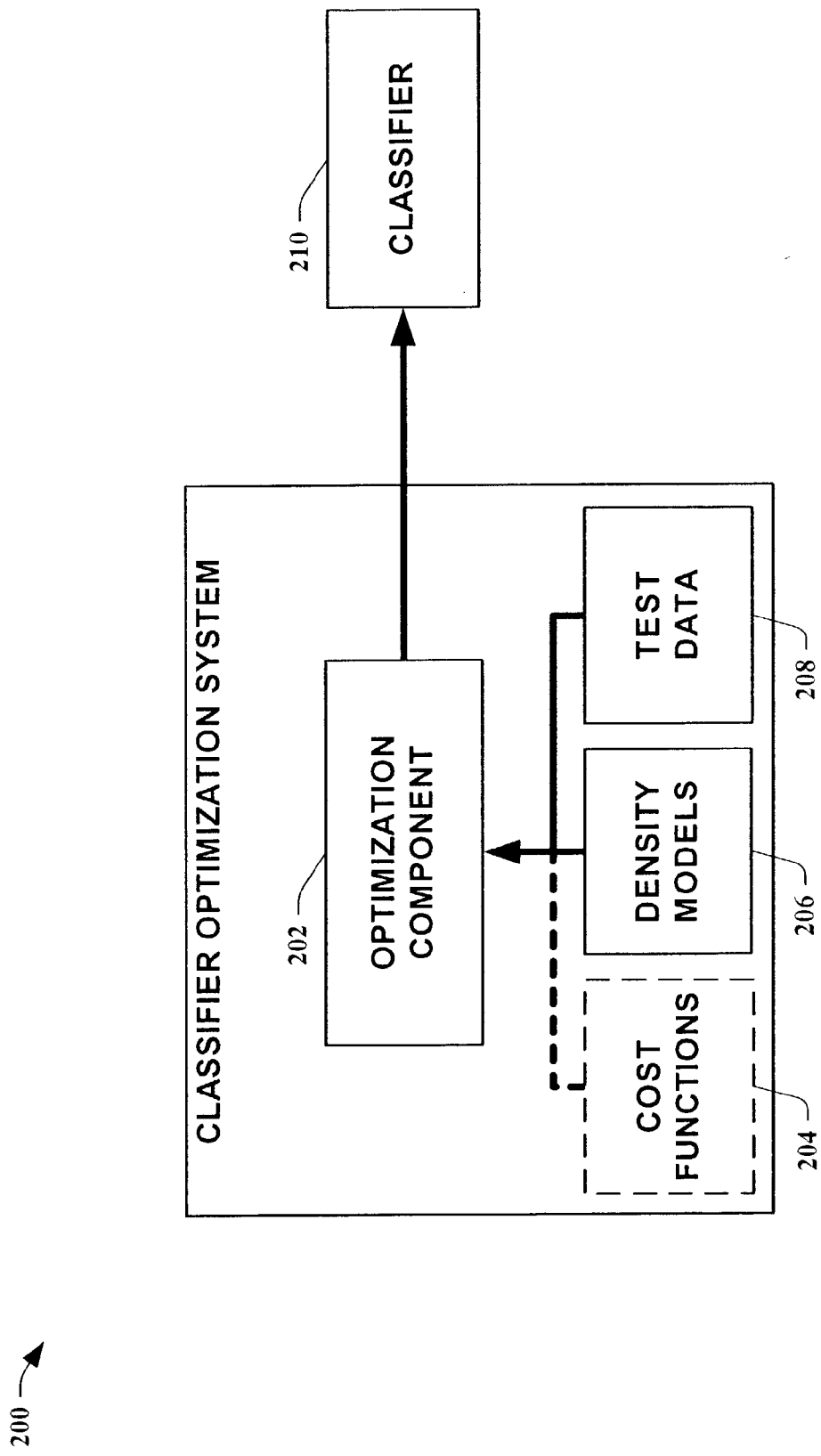
FIG. 2 is a block diagram of a classifier optimization system in accordance with an aspect of the present invention.

Turning to FIG. 2, a block diagram of a classifier optimization system 200 in accordance with an aspect of the present invention is illustrated. In this instance of the present invention, the classifier optimization system 200 is comprised of an optimization component 202, an optional cost function component 204, a density models identifier component 206, and a test data component 208. The optimization component 202 utilizes the input components 204-208 to select density models that comprise a configuration that optimizes a desired characteristic for a classifier 210. The optional cost function component 204 is utilized, in this instance of the present invention, to supply cost of density models to the optimization component 202, which facilitates optimizing the classifier 210 when cost is a factor in the optimization. Cost can include, for example, complexity or size for a configuration of density models. In other instances of the present invention, cost information is not required for optimization and, thus, is optional and not employed in that case. The density models identifier component 206 identifies alternative density models utilized for each class of a multi-class classification system. Identifying can include, but is not limited to, obtaining alternative density models per class and/or making density models available to the optimization component 202 to allow it to determine which classes the alternative models are evaluated for. The test data component 208 provides test data that is employed by the optimization component 202 to facilitate in optimizing a desired characteristic for the classifier 210. In one instance of the present invention, the test data component 208 provides test data utilized for determining classification accuracy of the density model configurations.

Figure 3:
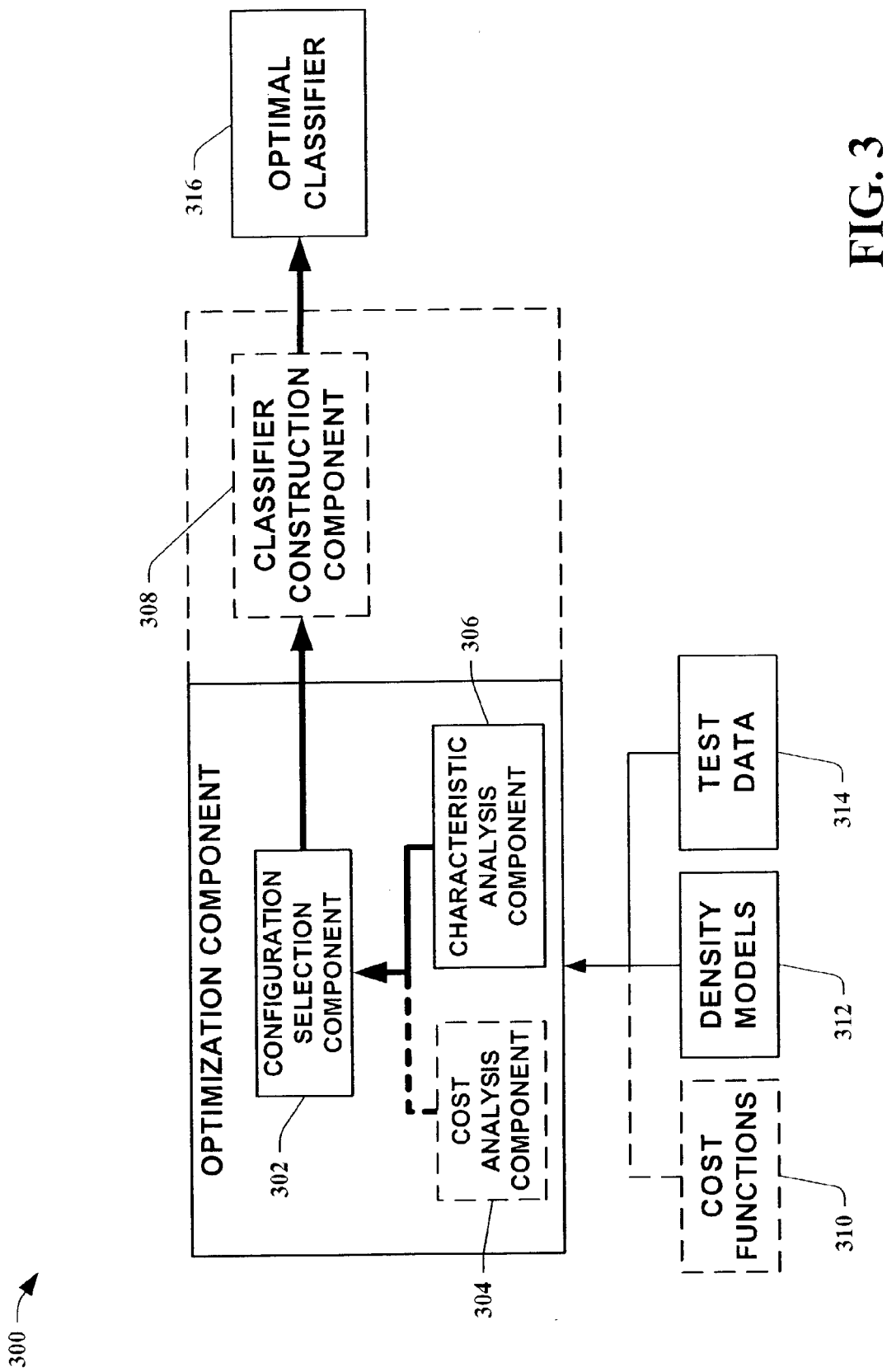
FIG. 3 is a block diagram of an optimization component in accordance with an aspect of the present invention.

Referring to FIG. 3, a block diagram of an optimization component 300 in accordance with an aspect of the present invention is depicted. In this instance of the present invention, the optimization component 300 is comprised of a configuration selection component 302, an optional cost analysis component 304, a desired characteristic analysis component 306, and an optional classifier construction component 308. Inputs into the optimization component 300 include, but are not limited to, an optional cost function component 310, a density models identifier component 312, and a test data component 314. The optional cost analysis component 304 provides the configuration selection component 302 with evaluations of cost parameters such as, for example, size for density models and/or density model configurations. The optional cost analysis component 304 typically utilizes cost data from the optional cost function component 310 to facilitate its processing. The desired characteristic analysis component 306 provides the configuration selection component 302 with evaluations pertaining to a desired characteristic such as, for example, classification accuracy of density model configurations. The desired characteristic analysis component 306 generally employs test data provided by the test data component 314 to facilitate its processing. The optional classifier construction component 308 builds an optimal classifier 316 based on a configuration of discriminatively selected density models provided by the configuration selection component 302. In other instances of the present invention, the optimization component 300 can function solely to provide only an optimal density model configuration and not include a function to actually generate an optimal classifier. To better appreciate the present invention, it is necessary to understand how models are constructed. Methods for building models for classification are often described as either discriminative methods or non-discriminative methods. A discriminative method constructs a model by utilizing both positive and negative examples for each class while constructing a classifier. While discriminative methods often perform better than non-discriminative methods, the construction of discriminative models can be problematic in situations in which the number of classes is substantially large and when some of the classes have small counts. In such situations, non-discriminative model construction techniques can be more applicable. A non-discriminative method constructs a separate model for each class using only positive examples for that class.

The most common non-discriminative technique for classifier construction is a density model approach. In this traditional technique, only a single separate density model is built for each class of interest. These density models are then combined to make a classifier through the use of Bayes' rule by combining the density models with a prior distribution over the classes. Typically, the density model for a class is traditionally chosen on the basis of its ability to represent density of features for that class. Thus, the choice for each class is independent of a choice made for other classes, despite the fact that the final use is a classification task in which alternative classes are compared. Contrarily, the present invention provides systems and methods for choosing among a set of alternative density models for each class of a set of classes to optimize a density model configuration utilized by a classifier. These systems and methods are employed to improve a resulting classifier constructed via the present invention. In one instance of the present invention, the systems and methods are employed to improve overall classification accuracy. In another instance of the present invention, it is employed to reduce a cost (e.g., size) of a resulting classifier while substantially maintaining classification accuracy.

Given a dataset and a set of alternative density models for each class, the present invention chooses a single model for each class, defining a "configuration." The configuration is chosen on the basis of a desired characteristic (e.g., accuracy) for a classifier constructed from density models in the configuration for a data set and optionally can include a cost associated with the density models. Obviously, the number of configurations can grow quickly and, as the number of classes grows substantially larger, it becomes infeasible to enumerate all of the possible configurations. The problem of identifying a configuration of models that possesses a desired characteristic such as, for example, the best accuracy is solved utilizing propagation algorithms in a (non-probabilistic) graphical model. The structure of the graphical model is determined by types of mistakes that emanate from utilizing a test data set. If a resulting model is sparse then a selection is considered to be effectively computed. In many cases, a resulting model is not sparse and propagation approximations are utilized to identify good configurations of models.

Next, an example of the problem of density model selection for classification is illustrated. The variables relating to this problem are generally a class variable $C=\{c_1, \ldots, c_J\}$, where $c_j$ is one of the possible classes of interest, and a set of variables $X=\{X_1, \ldots, X_N\}$ that are used in making a class determination. A training set $D=y^1, \ldots, y^L$ of L cases is given that has values for both C and X. Utilize $D_j(1=j=J)$, for simplicity, to denote subsets of D for which a correct class is $c_j$. An $l^{th}$ case of a data set is denoted for class $c_j$ by $x_j^l$ where a value for C is given by the subscript j.

As an assumption, in this example, a set of alternative density models for each class is provided. An $i^{th}$ model is denoted for class $c_j$ by $M_j^i$. To simplify the notation, an additional assumption is made that each class has the same number of alternative models 1. The alternative density models that are assumed to be given can be learned, for example, via the training set supra and/or a separate training set. In other instances of the present invention, the selection of a plurality of density models includes mixtures of Bayesian Networks with different numbers of mixtures of components as elaborated in U.S. application Ser. No. 10/075,962 filed Feb. 14, 2002, by John Bennett, et al., entitled HANDWRITING RECOGNITION WITH MIXTURES OF BAYESIAN NETWORKS; and U.S. application Ser. No. 09/220,197 filed Dec. 23, 1998, by Bo Thiesson, et al., entitled SPEECH RECOGNITION WITH MIXTURES OF BAYESIAN NETWORKS (herein incorporated by reference). The numbers of mixtures can be varied along with the number of components. The alternative density models can be utilized for both handwriting and/or speech recognition systems and the like.

$p(c_j)$ is utilized to denote a prior on the classes and $p(x|M_j^i)$ is utilized to denote a likelihood of values $X=x$ given the $i^{th}$ model for the $j^{th}$ class. A configuration of density models is denoted by $s=(s_1, \ldots, s_J)$, where $s_j \in \{1, \ldots, 1\}$ indexes a model selected for class j.

Performance for a configuration of density models is evaluated by an overall classification desired characteristic, such as accuracy in this example, is obtained for associated test data sets $D_1, \ldots, D_J$. If $n_j$ is the number of cases in data set $D_j$, the total number of errors and overall classification accuracy are computed as follows:

$$\text{Errors}(D_1, \ldots, D_J | s_1, \ldots, s_J) = \sum_{j=1}^{J} \sum_{l=1}^{n_j} 1 - x^j(\text{argmax}_k [p(x_j^l | M_k^{s_k}) p(c_k)]) \quad (1)$$

$$\text{Accuracy}(D_1, \ldots, D_J | s_1, \ldots, s_J) = 1 - \frac{\text{Errors}(D_1, \ldots, D_J | s_1, \ldots, s_J)}{\sum_{j=1}^{J} n_j} \quad (2)$$

where argmax is the "argument of the maximum" of a given function, and where $x^a(b)$ is one if a=b and zero otherwise. Note, when computing the total number of errors, the density model with the highest posterior probability is selected through a simple application of Bayes' rule: $p(M_k^{k_k}|x) \propto p(x|M_k^{k_k})p(c_k)$.

For large scale classification tasks where many thousands of density models are used for classification, storage and/or memory constraints can force a utilization of a density model configuration that is smaller than the best configuration. By adding a cost term to the density model configuration selection criterion, the size of the selected configuration can be reduced while maintaining accuracy. It should also be noted that conditions exist where the most complex density model configuration significantly degrades performance of a classification system. So, even if size is not a constraint, selecting the most complex density model configuration is not, in general, a good choice.

One instance of the present invention utilizes discriminative density model selection for classification to identify a configuration s of models that minimizes:

$$\text{Errors}(s,D) + \alpha \text{Cost}(s) \quad (3)$$

where $\alpha$ is a given coefficient of cost and Cost(s) is a cost associated with a particular configuration. For this example, $\text{Cost}(s) = \Sigma_j \text{Size}(M_j^{s_j})$ where the $\text{Size}(M_j^i)$ is the number of parameters in the $i^{th}$ model for class j.

A junction tree algorithm is then employed to identify a configuration that minimizes Equation (3). A junction tree is constructed in two phases. In a first phase, an error graph is constructed. The error graph captures confusability between classes. Each class is represented by a vertex in the graph. The lack of an edge between the vertices for class $c_j$ and $c_k$ indicates that there is no configuration of density models in which a data point can be mistakenly classified as belonging to one class instead of another class. In a second phase, the error graph is triangulated. Maximal cliques of the triangulated error graph form the junction tree. In the second phase, each clique in the junction tree is associated with a potential which has values indexed by density model configurations for classes that appear in a clique. The values of the potentials are set to represent costs (e.g., density model sizes) and errors associated with classification mistakes. The resulting junction tree with potentials is utilized to find an optimal configuration of density models by applying a min-sum algorithm (e.g., Aji, S. and McEliece, R. (2000); *The Generalized Distributive Law*; IEEE Transactions on Information Theory; 46(2):325-343). In situations where the error graph is highly connected, computations are intractable and typically employ either approximate propagation techniques and/or pruning of the error graph.

In more detail, a configuration that minimizes Equation (3) is identified as follows. First, a representation for confusable classes is constructed. This is accomplished, for example, by a "Construct-Error-Graph" procedure as shown in Table 1, infra. In this procedure, for each case, alternative density models are ranked on the basis of the likelihood of a case. This implicitly assumes that a prior for the classes is uniform. This procedure is also adaptable to a case in which one does not choose to assume a uniform prior on the classes.

TABLE 1

Logic for Error Graph

Construct-Error-Graph (DataSet D)
Let G be an empty graph with vertices corresponding to classes;
For each case in data set D:
    Create a set S of all classes that have models that are ranked above any model for the correct class;
    Add an undirected edge between each pair of classes in S and an undirected edge between the correct class and each class in S;
Return G.

The complexity of the min-sum procedure is related to the connectivity of the error graph for the data set. If models are included that are extremely poor models for a class then the size of the cliques may become substantially large. To reduce the complexity of the procedure, the algorithm is modified to count the number of mistakes between a pair of classes and all of the edges between classes are pruned for which there are fewer errors than a predetermined threshold.

The next procedure is to create potentials. In this instance of the present invention, for example, costs and error information are represented via a junction tree. The junction tree is constructed from an error graph by triangulating the (possibly pruned) error graph. Note that it is NP-hard ("NP" is the class that a Nondeterministic Turing machine accepts in polynomial time, and the complexity class of decision problems that are intrinsically harder than those that can be solved by a nondeterministic Turing machine in polynomial time are "NP-hard.") to identify the triangulation that minimizes the size of maximal cliques of a resulting graph (see: Arnborg, S., Corneil, D. G., and Proskurowski, A. (1987); *Complexity of Finding Embeddings in a k-Tree*; SIAM Journal of Algebraic Discrete Methods; 8(2):277-284). Hence, an approximate minimal triangulation is found instead. The cliques of the triangulated error graph provide the junction tree. A potential is associated with each of the (maximal) cliques in the junction tree. The potential contains a value for each of the possible configurations of variables in a clique with which it is associated. For this instance of the present invention, the variables are the classes, and the possible values for the variables index the alternative density models. Values are assigned to the potentials of the junction tree, for example, with a "Fill-Potentials" procedure as noted in Table 2, infra.

TABLE 2

Logic for Potentials

Fill-Potentials (DataSet D, Join-Tree T)
For each class J, find the smallest clique in T that contains J;
For each configuration of the potential, add alpha times the size of the model for class J that is indexed by that configuration;
For each case L in the data set:
    Identify the correct class X for L;
    For each model I from class X:
        Get the list of models from the other classes that have better likelihoods for case L;
        Let Y be the set of classes represented in this list;
        Find a clique CL that contains both X and Y;
        (Note: There might not be one if pruning has been performed. In that case, find a clique that contains the most variables in X union Y and remove the variables from Y not in clique CL.)
        Let Z be the set of model configurations for Y in which one of the models in Y is better than model I for class X;
        Add one to each configuration of the potential for CL that has the $I^{th}$ model for class X and is consistent with a configuration in Z;
End.

After potentials have been created and filled, a min-sum propagation algorithm (e.g., Aji and McEliece, 2000, id) is employed. If an optimal configuration, in terms of accuracy for example, is to be identified, set $\alpha=0$. If a configuration that is smaller but maintains the highest accuracy possible is to be identified, adjust a to be larger than zero. As one increases the size of $\alpha$, the size of resulting configurations decrease.

To better illustrate the present invention, an example of one instance is given. For this example, four classes are assumed and two density models are given along with a dataset for each class. Density models for classes are denoted by $M_1=\{M_1^1, M_1^2\}$, $M_2=\{M_2^1, M_2^2\}$, $M_3=\{M_3^1, M_3^2\}$, and $M_4=\{M_4^1, M_4^2\}$ and associated training data sets for the classes are denoted by $D_1\{x_1^1, x_1^2\}$, $D_2=\{x_2^1, x_2^2\}$, $D_3=\{x_3^1, x_3^2\}$, and $D_4=\{x_4^1, x_4^2\}$.

Turning to FIG. 4, a table 400 illustrating a method of discriminative density model selection in accordance with an aspect of the present invention is shown. Each column of the table 400 shown in FIG. 4 contains a data case and a list of models ranked according to the likelihood for that case. For instance, for data case $x_1^1$ the model with highest likelihood is model $M_1^2$ followed by models $M_3^1$ and $M_1^1$. Hence, selecting a model configuration involving $M_3^1$ and $M_1^1$ would result in a wrong classification for case $x_1^1$. Note that no models ranked below the lowest ranked correct model are included in the list. These models have no effect on the model configuration selection method.

Figure 5:
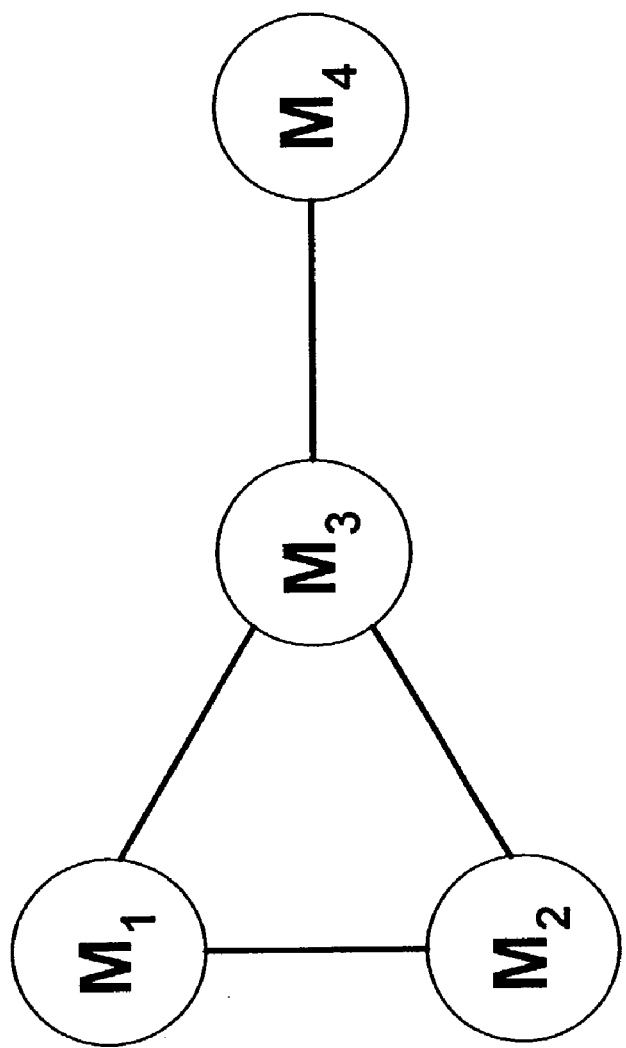
FIG. 5 is a diagram illustrating a graphical structure in accordance with an aspect of the present invention.

In FIG. 5, a diagram illustrating a graphical structure 500 in accordance with an aspect of the present invention is depicted. When constructing the error graph, case $x_2^1$ leads the algorithm to add all edges between model classes $M_1$, $M_2$, and $M_3$. Adding edges to the error graph for all cases in the example results in a triangulated graphical structure 500 as illustrated in FIG. 5.

The value for all potentials is initialized to zero for every configuration. For this example, set $\alpha=0$, that is, effectively there is no difference in costs for alternative configurations. Next, consider each case and increment potentials appropriately. When considering case $x_4^2$, add a count of one to configuration $(M_3^1, M_4^1)$ in a potential table for $M_3$ and $M_4$. For a slightly more complicated example when considering case $x_2^1$, add a count of one to configurations $(M_1^1, M_2^1, M_3^1)$, $(M_1^1, M_2^1, M_3^2)$, $(M_1^2, M_2^1, M_3^1)$, and $(M_1^2, M_2^1, M_3^2)$ in a potential table for $M_1$, $M_2$, and $M_3$. Adding counts for all cases results in potential tables 600 as shown in FIG. 6. Turning to FIG. 7, consistent marginal potential tables 700 as obtained after min-sum propagation are shown. From these potential tables 700, it is evident that a configuration $(M_1^1, M_2^2, M_3^2, M_4^1)$ with a total of $0+0-\min\{0,1\}=0$ errors is the best configuration for the classification task. In this manner, the present invention provides methods for choosing among a set of density models for a set of classes of interest. These methods allow for choosing a set of density models that can achieve substantial accuracy while allowing one to limit a cost (e.g., size) of a resulting set of models. They are applied to alternative data sets and alternative classes of density models. Additionally, alternative approximations such as loopy min-sum propagation are alternatives to the approach of pruning the error-graph.

Figure 8:
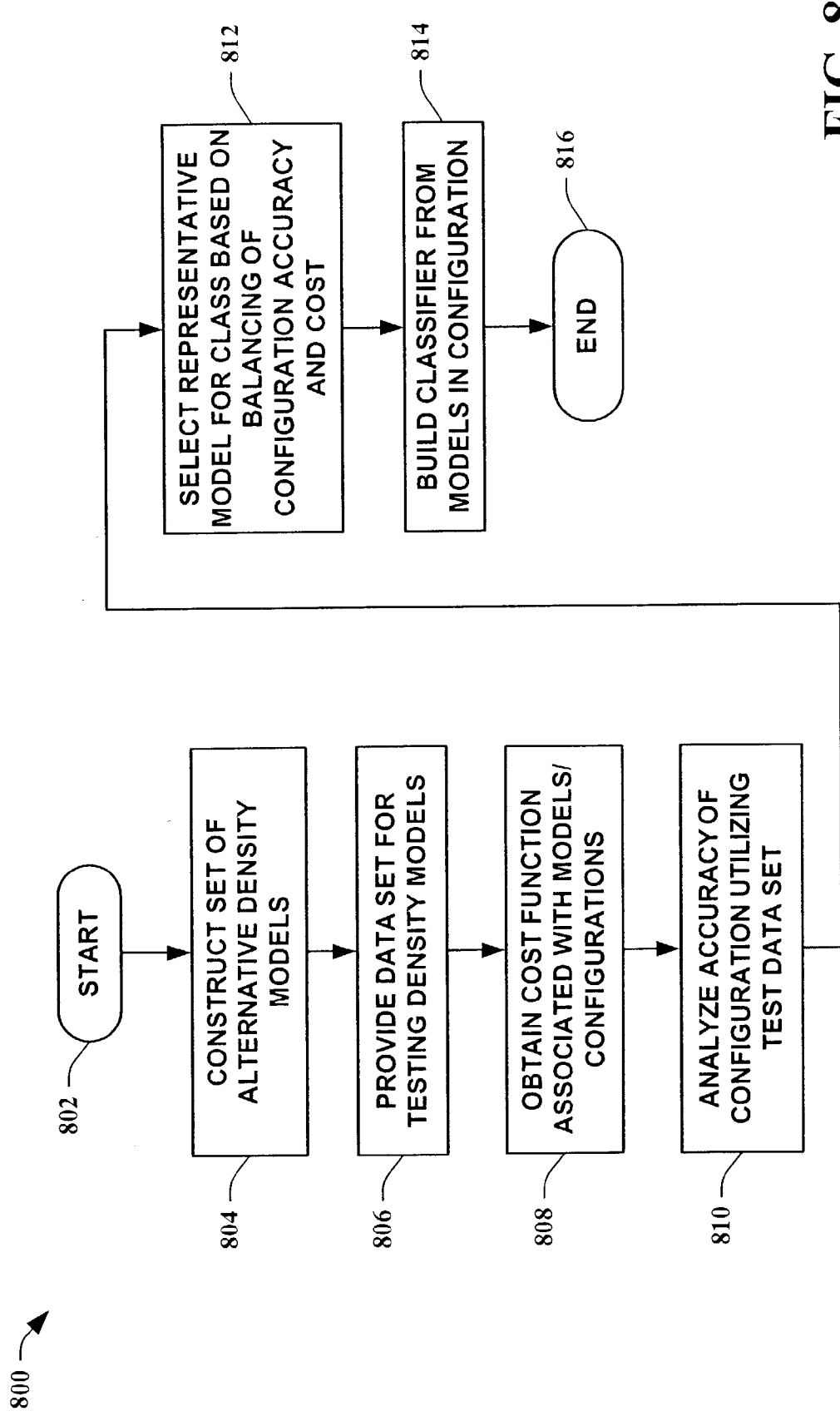
FIG. 8 is a flow diagram of a method of constructing a classifier in accordance with an aspect of the present invention.
Figure 9:
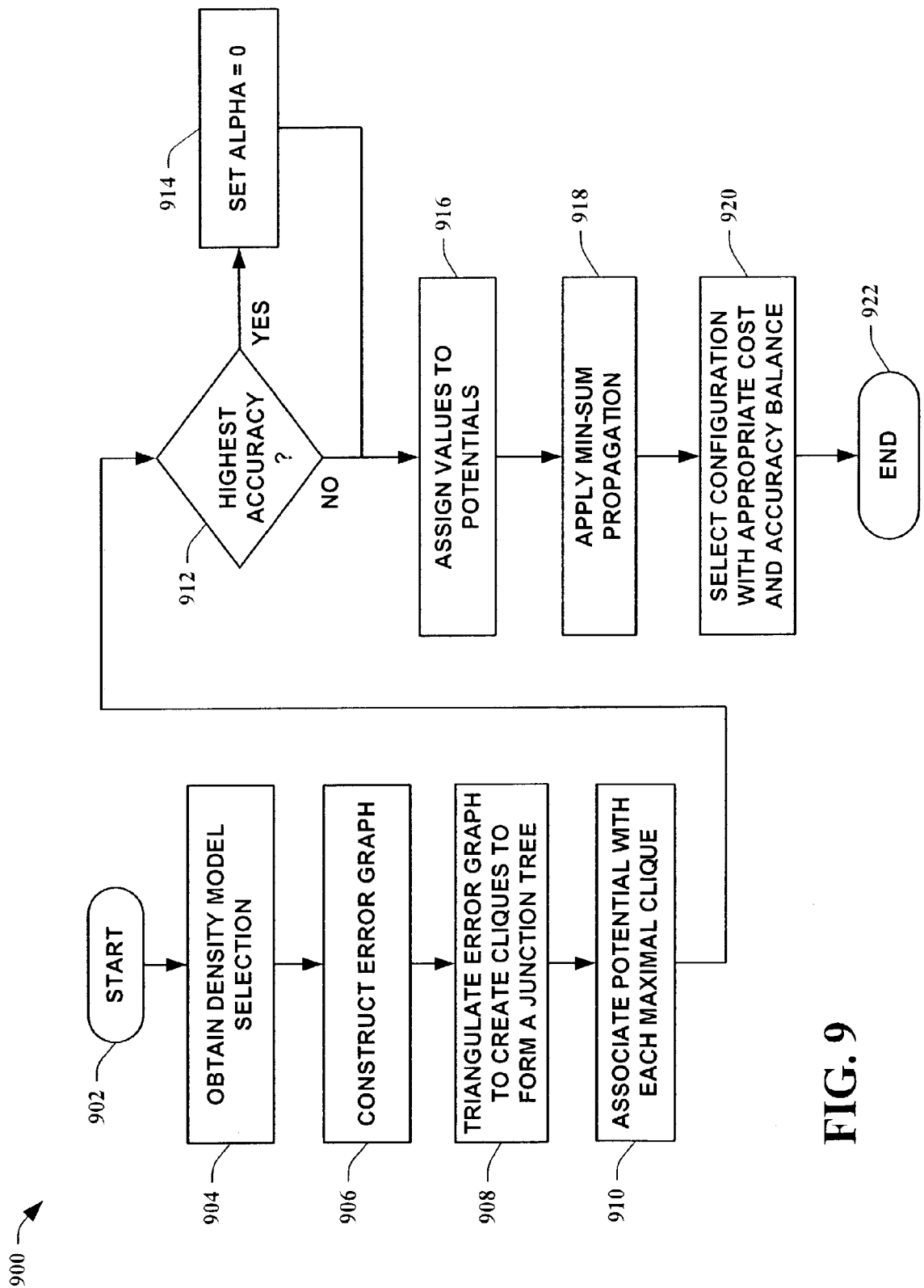
FIG. 9 is a flow diagram of a method of discriminatively selecting density models in accordance with an aspect of the present invention.

In view of the exemplary systems shown and described above, methodologies that may be implemented in accordance with the present invention will be better appreciated with reference to the flow charts of FIGS. 8-9. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 8, a flow diagram of a method 800 of constructing a classifier in accordance with an aspect of the present invention is illustrated. The method 800 starts 802 by constructing a set of alternative density models for each class of a classification system 804. This allows for analyzing several selections for each class to find an optimum density model. At least one data set is then provided for testing the density models for a desired characteristic such as accuracy and the like 806. At least one function is obtained for density models and/or configurations 808. The function can include a cost function such as size and complexity and the like. In other instances of the present invention, the function is a function relating to a desired characteristic that facilitates in obtaining an optimum classifier with regard to that characteristic. The function can apply to single density models and/or groups or configurations of density models. The test data set is then utilized to analyze the desired characteristic such as accuracy and the like of the density models and/or configurations of density models 810. A representative density model is then selected for each class of a classification system based on a balancing of desired characteristics such as cost and accuracy 812. Each representative density model exhibits desired characteristics such that a configuration as a whole can be employed to optimize a classifier with regard to at least one desired characteristic. A classifier is then constructed from the selected representative density models 814. This classifier is optimized for the desired characteristic. In this manner, a recognition system classifier can be constructed such that it has a minimum size while still retaining substantial accuracy. This allows recognition systems such as handwriting and/or speech to be utilized on slower processor devices such as mini-laptops, handhelds, tablet pc's, and the like. In other instances of the present invention, the method 800 does not require the building of the classifier. Thus, the present invention can be employed to provide discriminatively selected density models that are optimized for at least one desired characteristic to another component.

Turning to FIG. 9, a flow diagram of a method 900 of discriminatively selecting density models in accordance with an aspect of the present invention is illustrated. In this instance of the present invention, at least one desired characteristic includes accuracy. The method 900 starts 902 by obtaining a selection of density models 904. The selection of density models includes a plurality of density models (i.e., alternative density models) for each class of a multi-class classification system. These density models are evaluated for desired characteristics and analysis can be based on a provided test data set. Configurations of density models representative of multiple classes are then evaluated by first constructing an error graph 906. The error graph is then triangulated to create cliques which form a junction tree. It should be noted that it is NP-hard to identify triangulation that minimizes sizes of maximal cliques of a resulting graph (see: Arnborg, S., Corneil, D. G., and Proskurowski, A. (1987), id). Hence, an approximate minimal triangulation is found instead. A potential is then associated with each maximal clique in the junction tree 910. A determination is then made as to whether highest accuracy is desirable 912. If yes, alpha is set to zero 914 and the method 900 continues. If no, alpha is not zeroed 912. Values are then assigned to the potentials 916. The potential contains a value for each possible configuration of variables in a clique with which it is associated. A min-sum propagation algorithm is then applied 918 (e.g., Aji, S. and McEliece, R. (2000), id). If it is desirable to identify a configuration that is smaller in size (i.e., cost) but also maintain a high accuracy, alpha can be adjusted to be greater than zero. As alpha increases, the size of the resulting configurations decreases. An appropriate configuration is then selected that balances at least one desired characteristic such as cost and/or accuracy 920, ending the flow 922.

Figure 10:
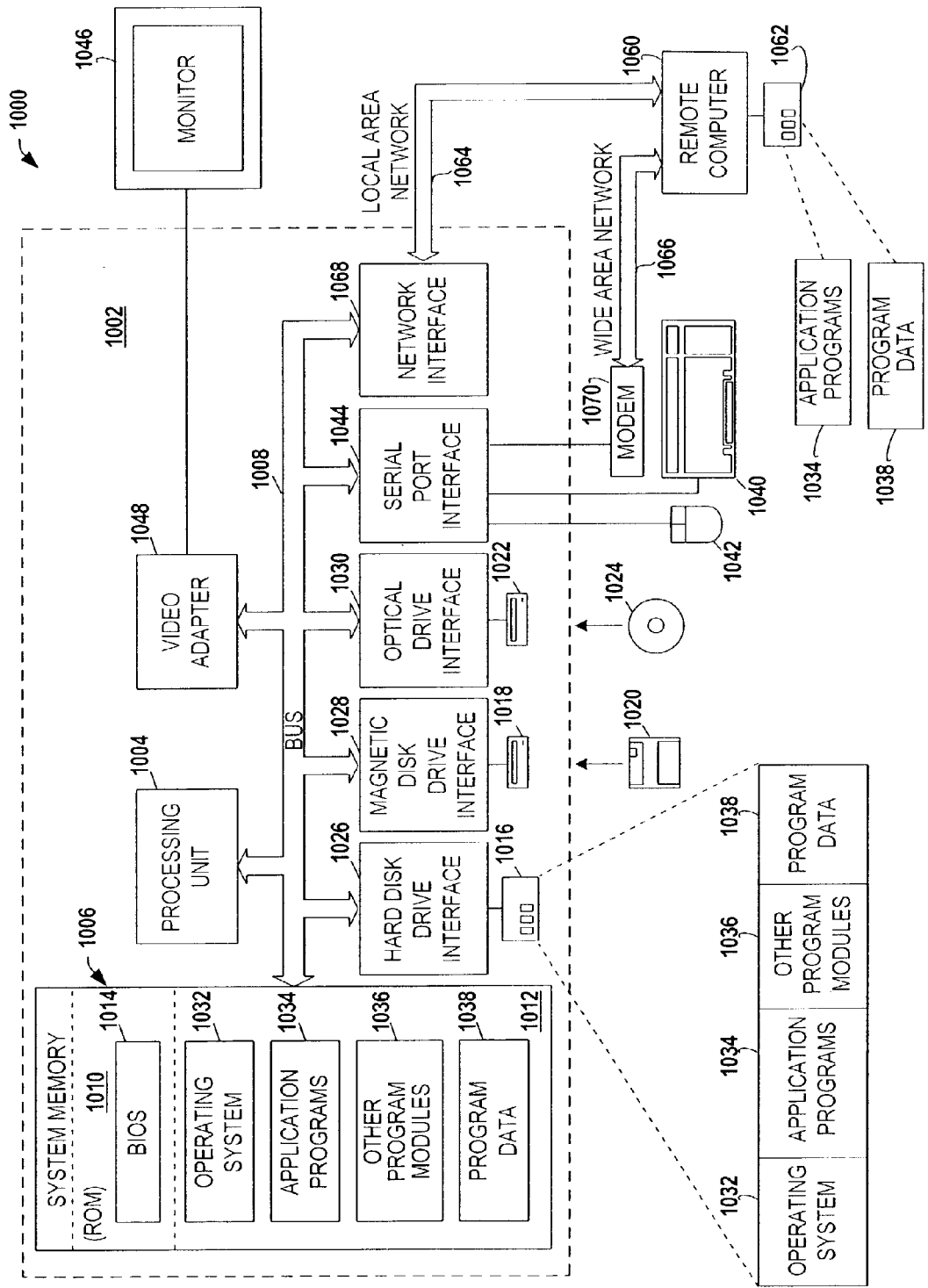
FIG. 10 illustrates an example operating environment in which the present invention can function.

In order to provide additional context for implementing various aspects of the present invention, FIG. 10 and the following discussion is intended to provide a brief, general description of a suitable computing environment 1000 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on standalone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 10, an exemplary system environment 1000 for implementing the various aspects of the invention includes a conventional computer 1002, including a processing unit 1004, a system memory 1006, and a system bus 1008 that couples various system components, including the system memory, to the processing unit 1004. The processing unit 1004 may be any commercially available or proprietary processor. In addition, the processing unit may be implemented as multi-processor formed of more than one processor, such as may be connected in parallel.

The system bus 1008 may be any of several types of bus structure including a memory bus or memory controller, a peripheral bus, and a local bus using any of a variety of conventional bus architectures such as PCI, VESA, Microchannel, ISA, and EISA, to name a few. The system memory 1006 includes read only memory (ROM) 1010 and random access memory (RAM) 1012. A basic input/output system (BIOS) 1014, containing the basic routines that help to transfer information between elements within the computer 1002, such as during start-up, is stored in ROM 1010.

The computer 1002 also may include, for example, a hard disk drive 1016, a magnetic disk drive 1018, e.g., to read from or write to a removable disk 1020, and an optical disk drive 1022, e.g., for reading from or writing to a CD-ROM disk 1024 or other optical media. The hard disk drive 1016, magnetic disk drive 1018, and optical disk drive 1022 are connected to the system bus 1008 by a hard disk drive interface 1026, a magnetic disk drive interface 1028, and an optical drive interface 1030, respectively. The drives 1016-1022 and their associated computer-readable media provide nonvolatile storage of data, data structures, computer-executable instructions, etc. for the computer 1002. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1000, and further that any such media may contain computer-executable instructions for performing the methods of the present invention.

A number of program modules may be stored in the drives 1016-1022 and RAM 1012, including an operating system 1032, one or more application programs 1034, other program modules 1036, and program data 1038. The operating system 1032 may be any suitable operating system or combination of operating systems. By way of example, the application programs 1034 can include a recognition system utilizing a classifier optimization system that employs, for example, a discriminative density model selection method in accordance with an aspect of the present invention.

A user can enter commands and information into the computer 1002 through one or more user input devices, such as a keyboard 1040 and a pointing device (e.g., a mouse 1042). Other input devices (not shown) may include a microphone, a joystick, a game pad, a satellite dish, wireless remote, a scanner, or the like. These and other input devices are often connected to the processing unit 1004 through a serial port interface 1044 that is coupled to the system bus 1008, but may be connected by other interfaces, such as a parallel port, a game port or a universal serial bus (USB). A monitor 1046 or other type of display device is also connected to the system bus 1008 via an interface, such as a video adapter 1048. In addition to the monitor 1046, the computer 1002 may include other peripheral output devices (not shown), such as speakers, printers, etc.

It is to be appreciated that the computer 1002 can operate in a networked environment using logical connections to one or more remote computers 1060. The remote computer 1060 may be a workstation, a server computer, a router, a peer device or other common network node, and typically includes many or all of the elements described relative to the computer 1002, although, for purposes of brevity, only a memory storage device 1062 is illustrated in FIG. 10. The logical connections depicted in FIG. 10 can include a local area network (LAN) 1064 and a wide area network (WAN) 1066. Such networking environments are commonplace in offices, enterprise-wide computer networks, intranets and the Internet.

When used in a LAN networking environment, for example, the computer 1002 is connected to the local network 1064 through a network interface or adapter 1068. When used in a WAN networking environment, the computer 1002 typically includes a modem (e.g., telephone, DSL, cable, etc.) 1070, or is connected to a communications server on the LAN, or has other means for establishing communications over the WAN 1066, such as the Internet. The modem 1070, which can be internal or external relative to the computer 1002, is connected to the system bus 1008 via the serial port interface 1044. In a networked environment, program modules (including application programs 1034) and/or program data 1038 can be stored in the remote memory storage device 1062. It will be appreciated that the network connections shown are exemplary and other means (e.g., wired or wireless) of establishing a communications link between the computers 1002 and 1060 can be used when carrying out an aspect of the present invention.

In accordance with the practices of persons skilled in the art of computer programming, the present invention has been described with reference to acts and symbolic representations of operations that are performed by a computer, such as the computer 1002 or remote computer 1060, unless otherwise indicated. Such acts and operations are sometimes referred to as being computer-executed. It will be appreciated that the acts and symbolically represented operations include the manipulation by the processing unit 1004 of electrical signals representing data bits which causes a resulting transformation or reduction of the electrical signal representation, and the maintenance of data bits at memory locations in the memory system (including the system memory 1006, hard drive 1016, floppy disks 1020, CD-ROM 1024, and remote memory 1062) to thereby reconfigure or otherwise alter the computer system's operation, as well as other processing of signals. The memory locations where such data bits are maintained are physical locations that have particular electrical, magnetic, or optical properties corresponding to the data bits.

Figure 11:
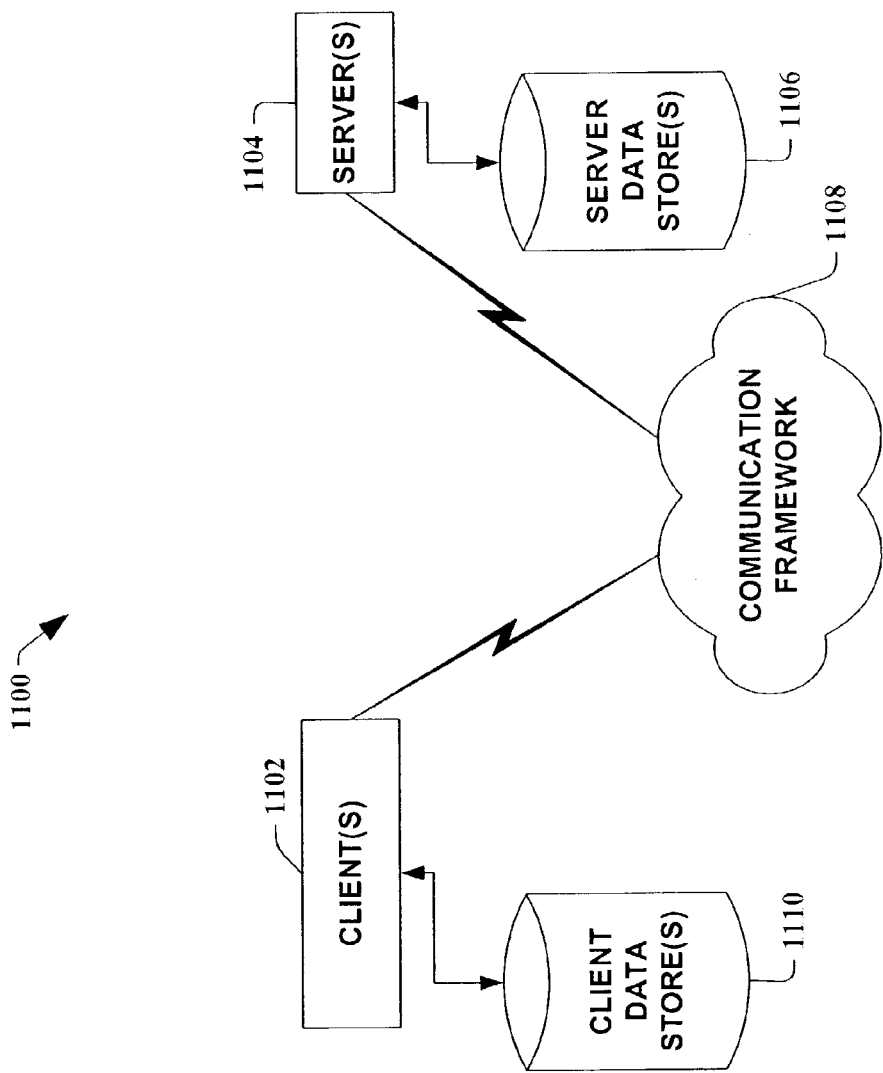
FIG. 11 illustrates another example operating environment in which the present invention can function.

FIG. 11 is another block diagram of a sample computing environment 1100 with which the present invention can interact. The system 1100 further illustrates a system that includes one or more client(s) 1102. The client(s) 1102 can be hardware and/or software (e.g., threads, processes, computing devices). The system 1100 also includes one or more server(s)

1104. The server(s) 1104 can also be hardware and/or software (e.g., threads, processes, computing devices). The servers 1104 can house threads to perform transformations by employing the present invention, for example. One possible communication between a client 1102 and a server 104 may be in the form of a data packet adapted to be transmitted between two or more computer processes. The system 1100 includes a communication framework 1108 that can be employed to facilitate communications between the client(s) 1102 and the server(s) 104. The client(s) 1102 are operably connected to one or more client data store(s) 1110 that can be employed to store information local to the client(s) 1102. Similarly, the server(s) 11104 are operably connected to one or more server data store(s) 1106 that can be employed to store information local to the servers 1104.

In one instance of the present invention, a data packet is transmitted between two or more computer components that facilitates recognition with the data packet comprised of, at least in part, recognition related information from a recognition system that utilizes, at least in part, a classifier with density models established, at least in part, via a discriminative density model selection means.

In another instance of the present invention, a computer readable medium storing computer executable components of a system for facilitating recognition is comprised of a recognition system that is comprised of, at least in part, a classifier with density models established, at least in part, via a discriminative density model selection means.

It is to be appreciated that the systems and/or methods of the present invention can be utilized in a recognition scheme for facilitating computer components and non-computer related components alike. Further, those skilled in the art will recognize that the systems and/or methods of the present invention can be employed in a vast array of electronic related technologies, including, but not limited to, computers, servers and/or handheld electronic devices and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A recognition system, comprising a memory having stored therein computer executable components and a processor that executes the following computer executable components:
   a density model identifier component that identifies a plurality of density models for each of at least two classes that are employed in connection with recognition; and
   an optimization component that at least:
      identifies a subset of the density models for employment in a recognition application;
      selects a model of the subset of the density models for each class to achieve an optimization based on, at least in part, multi-class classification accuracy; and
      determines the optimization based on, at least in part:
         forming an error graph that captures confusability between the at least two classes;
         triangulating the error graph to form a junction tree that includes cliques; and
         associating each clique of the junction tree with a potential, wherein the potential is based on a value for each of the possible configurations of variables in the clique.

2. The system of claim 1, wherein the optimization is achieved based on, at least in part, reducing cost associated with a configuration, wherein the configuration comprises selection of a model of the subset of the density models for each class.

3. The system of claim 2, wherein reducing cost includes reducing density of model size.

4. The system of claim 2, wherein the optimization component utilizes a junction tree algorithm to select the model of the subset of the density models for each class based on the following equation:

$$\text{Errors}(s,D)+\alpha\text{Cost}(s),$$

wherein $\alpha$ is a given coefficient of cost and $\text{Cost}(s)$ is a cost associated with a particular configuration s.

5. The system of claim 1 utilized as a handwriting recognition system.

6. The system of claim 1, further including pruning edges of the error graph for determining, at least in part, the optimization.

7. The system of claim 6, wherein pruning edges comprises counting mistakes between a pair of classes and removing all edges between classes based on a predetermined error threshold.

8. The system of claim 1, wherein the potential is associated with a value representing alternative density models.

9. The system of claim 1, wherein the optimization component utilizes, at least in part, a min-sum algorithm for determining the optimization.

10. The system of claim 1 utilized as a speech recognition system.

11. The system of claim 1, wherein the plurality of density models comprises mixtures of Bayesian Networks for handwriting recognition.

12. The system of claim 11, wherein the mixtures of Bayesian Networks comprises varying numbers of components in mixtures.

13. The system of claim 1, wherein the plurality of density models comprises mixtures of Bayesian Networks for speech recognition.

14. The system of claim 13, wherein the mixtures of Bayesian Networks comprises varying numbers of components in mixtures.

15. A method of selecting density models for a classifier, wherein the method is performed by a processor that executes at least the following acts:
   constructing a set of at least two alternative density models for at least one class in a classification system having at least two classes;
   identifying a subset of the density models for employment in a recognition application;
   selecting a density model from the set of at least two alternative density models for the at least one class based on, at least in part, constructing an error graph to capture confusability between classes, constructing a junction tree, and employing at least one desired characteristic; and
   triangulating an error graph to form cliques of the junction tree based on, at least in part, a plurality of potentials associated with at least one clique of the junction tree, wherein each potential of the plurality of potentials is based on values indexed by a model configuration for classes that appear in a clique.

16. The method of claim 15, wherein the desired characteristic comprises classification accuracy and cost.

17. The method of claim 16, wherein the cost comprises model size.

18. The method of claim 15, wherein the desired characteristic comprises a balance of classification, accuracy, and cost.

19. The method of claim 15, further including:
providing a data set for testing the alternative density models;
selecting subsets of the density models to form at least one configuration; and
evaluating an attribute of the configuration utilizing the test data set.

20. The method of claim 19, wherein the attribute comprises classification accuracy.

21. The method of claim 15, further comprising:
obtaining at least one cost function associated with a subset of density models that form a configuration representative of classes in the classification system.

22. The method of claim 21, further including:
adjusting a cost coefficient to vary at least one of classification accuracy of the configuration of density models or cost of the configuration of density models.

23. The method of claim 15, further including:
pruning edges of the error graph to facilitate selecting the density model.

24. The system of claim 23, wherein pruning edges of the error graph further comprises counting mistakes between a pair of classes and removing edges between classes based on a predetermined error threshold.

25. The method of claim 15, further including:
setting the values of the potentials to represent costs and errors associated with classification mistakes.

26. The method of claim 25, further including:
selecting the density model based solely on classification accuracy by setting a cost coefficient to zero.

27. The method of claim 15, further comprising:
building an optimized classifier from the subset of density models that enable selecting the density model.

28. The method of claim 15, wherein the alternative density models comprises mixtures of Bayesian Networks.

29. The method of claim 28, wherein the mixtures of Bayesian Networks comprises varying numbers of components in mixtures.

30. The method of claim 28, wherein the mixtures of Bayesian Networks is utilized in conjunction with at least one of a handwriting recognition system or a speech recognition system.

31. A classifier optimization system comprising a memory having stored therein computer executable components and a processor that executes the following computer executable components:
means for discriminatively selecting a density model from a plurality of density models for each class of a classification system having at least two classes; and
means for optimizing a configuration of the density model by utilizing, at least in part, potentials associated with at least one clique of a junction tree, wherein the junction tree is formed by triangulating an error graph that captures confusability between at least two classes, and wherein each potential is based on a value for each of the possible configurations of variables of a clique associated with the potential.

32. The system of claim 31, further comprising means for determining the optimal configuration of density models based on at least one of the following: an error graph, a junction tree, or a min-sum propagation algorithm.

33. The system of claim 31, further comprising:
means for building an optimized classifier based on a configuration comprising the discriminatively selected density models representative of the classes of the classification.

34. The system of claim 33, wherein the optimized classifier is optimized based on at least one of classification accuracy, classification cost, or a balance of classification accuracy and cost.

35. A computer readable medium having stored thereon computer executable components of the system of claim 1.

36. A device employing the method of claim 15, comprising a computer, a server, or a handheld electronic device.

37. A device employing the system of claim 1, comprising a computer, a server, or a handheld electronic device.

* * * * *